United States Patent [19]

Rasala et al.

[11] 4,208,722
[45] Jun. 17, 1980

[54] FLOATING POINT DATA PROCESSING SYSTEM

[75] Inventors: Edward J. Rasala, Westboro, Mass.; Charles J. Young, Wake Forest, N.C.

[73] Assignee: Data General Corporation, Westboro, Mass.

[21] Appl. No.: 871,616

[22] Filed: Jan. 23, 1978

[51] Int. Cl.² .............................................. G06F 7/52
[52] U.S. Cl. .................................... 364/760; 364/748
[58] Field of Search ............................... 364/748, 760

[56] References Cited

U.S. PATENT DOCUMENTS

| | | | |
|---|---|---|---|
| 3,366,780 | 1/1968 | Lee et al. ........................... | 364/760 |
| 3,515,344 | 6/1970 | Goldschmidt et al. ............ | 364/748 X |
| 3,730,425 | 5/1973 | Kindell et al. ..................... | 364/760 |
| 3,871,578 | 3/1975 | Van de Goor et al. ............ | 364/748 |

Primary Examiner—Jerry Smith
Attorney, Agent, or Firm—Robert F. O'Connell

[57] ABSTRACT

A digital data multiplier, particularly useful in floating point processing systems, wherein a first digital word representing a first value is multiplied by successive groups of bits of a second digital word representing a second value to form successive partial products which are combined to form successive partial sums, the final sum of all such combined partial sums producing a digital word representing the final product of the first and second values.

9 Claims, 10 Drawing Figures

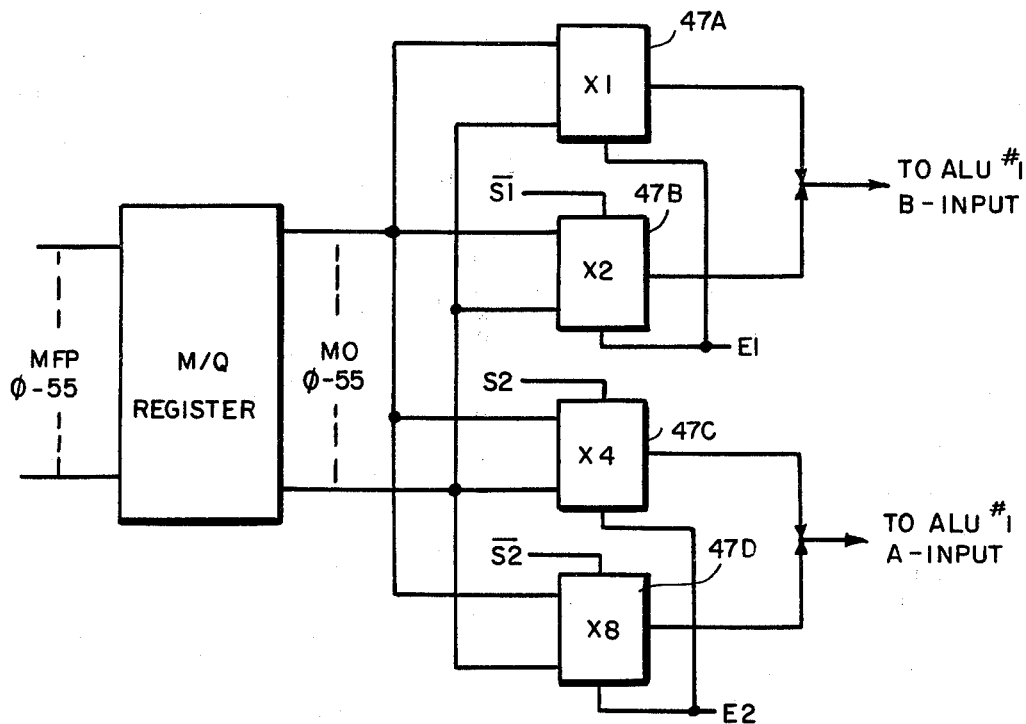
FIG.6
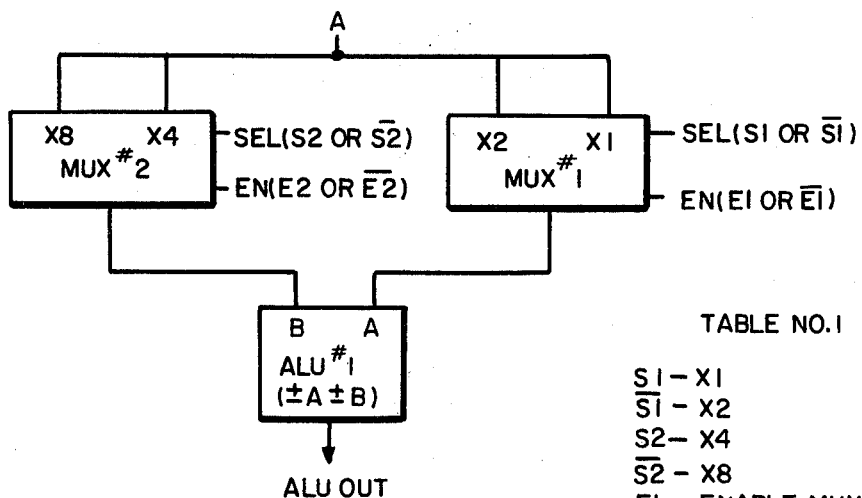
FIG.7
TABLE NO.1
S1 — X1
$\overline{S1}$ — X2
S2 — X4
$\overline{S2}$ — X8
E1 — ENABLE MUX #1
$\overline{E1}$ — DISABLE MUX #1
E2 — ENABLE MUX #2
$\overline{E2}$ — DISABLE MUX #2
FIG.8

| 4-BIT MULTIPLIER VALUE | CN | SH 52-55 | PARTIAL SUM | ALU #2 | PARTIAL PRODUCT ALU #1 | CN+1 | MUX #2 SEL | EN | MUX #1 SEL | EN | ALU #1 | ALU #2 |
|---|---|---|---|---|---|---|---|---|---|---|---|---|
| 0 | 0 | 0000 | PS | + | (0A+0A) | 0 | x | $\overline{E2}$ | x | $\overline{E1}$ | ADD | ADD |
| 1 | 0 | 0001 | PS | + | (0A+1A) | 0 | x | $\overline{E2}$ | S1 | E1 | ADD | ADD |
| 2 | 0 | 0010 | PS | + | (4A−2A) | 0 | S2 | E2 | $\overline{S1}$ | E1 | SUB | ADD |
| 3 | 0 | 0011 | PS | + | (4A−1A) | 0 | S2 | E2 | $\overline{S1}$ | E1 | SUB | ADD |
| 4 | 0 | 0100 | PS | + | (4A−0A) | 0 | S2 | E2 | x | $\overline{E1}$ | ADD | ADD |
| 5 | 0 | 0101 | PS | + | (4A+1A) | 0 | S2 | E2 | S1 | E1 | ADD | ADD |
| 6 | 0 | 0110 | PS | + | (8A−2A) | 0 | $\overline{S2}$ | E2 | $\overline{S1}$ | E1 | SUB | ADD |
| 7 | 0 | 0111 | PS | + | (8A−1A) | 0 | $\overline{S2}$ | E2 | $\overline{S1}$ | E1 | SUB | ADD |
| 8 | 0 | 1000 | PS | − | (8A−0A) | 1 | $\overline{S2}$ | E2 | x | $\overline{E1}$ | SUB | SUB |
| 9 | 0 | 1001 | PS | − | (8A−1A) | 1 | $\overline{S2}$ | E2 | $\overline{S1}$ | E1 | SUB | SUB |
| 10 | 0 | 1010 | PS | − | (4A+2A) | 1 | S2 | E2 | S1 | E1 | ADD | SUB |
| 11 | 0 | 1011 | PS | − | (4A+1A) | 1 | S2 | E2 | S1 | E1 | ADD | SUB |
| 12 | 0 | 1100 | PS | − | (4A−0A) | 1 | S2 | E2 | x | $\overline{E1}$ | ADD | SUB |
| 13 | 0 | 1101 | PS | − | (4A−1A) | 1 | S2 | E2 | $\overline{S1}$ | E1 | SUB | SUB |
| 14 | 0 | 1110 | PS | − | (0A+2A) | 1 | x | $\overline{E2}$ | S1 | E1 | SUB | SUB |
| 15 | 0 | 1111 | PS | − | (0A+1 ) | 1 | x | $\overline{E2}$ | S1 | E1 | SUB | SUB |
| 1 | 1 | 0000 | PS | + | (0A+1A) | 0 | x | $\overline{E2}$ | S1 | E1 | ADD | ADD |
| 2 | 1 | 0001 | PS | + | (0A+2A) | 0 | x | $\overline{E2}$ | S1 | E1 | ADD | ADD |
| 3 | 1 | 0010 | PS | + | (4A− A) | 0 | S2 | E2 | S1 | E1 | SUB | ADD |

FIG. 10

TABLE NO. 2

| | | | PS | ± | expr | bit | S | E | SI | EI | op1 | op2 |
|---|---|---|---|---|---|---|---|---|---|---|---|---|
| 4 | — | 0011 | | | | | | | | | | |
| 5 | — | 0100 | PS | + | $(4A - \phi A)$ | 0 | S2 | E2 | | $\overline{EI}$ | SUB | ADD |
| 6 | — | 0101 | PS | + | $(4A + 1A)$ | 0 | S2 | E2 | SI | EI | ADD | ADD |
| 7 | — | 0110 | PS | + | $(4A + 2A)$ | 0 | S2 | E2 | $\overline{SI}$ | EI | ADD | ADD |
| 8 | — | 0111 | PS | + | $(8A + A)$ | 0 | $\overline{S2}$ | E2 | SI | EI | SUB | ADD |
| 9 | — | 1000 | PS | + | $(8A + \phi A)$ | 0 | $\overline{S2}$ | E2 | | $\overline{EI}$ | SUB | ADD |
| 10 | — | 1001 | PS | — | $(8A - A)$ | 1 | $\overline{S2}$ | E2 | SI | EI | ADD | SUB |
| 11 | — | 1010 | PS | — | $(8A - 2A)$ | 1 | $\overline{S2}$ | E2 | $\overline{SI}$ | EI | ADD | SUB |
| 12 | — | 1011 | PS | — | $(4A + 1A)$ | 1 | S2 | E2 | SI | EI | SUB | SUB |
| 13 | — | 1100 | PS | — | $(4A + \phi A)$ | 1 | S2 | E2 | | $\overline{EI}$ | SUB | SUB |
| 14 | — | 1101 | PS | — | $(4A + 1A)$ | 1 | S2 | E2 | SI | EI | ADD | SUB |
| 15 | — | 1110 | PS | — | $(4A - 2A)$ | 1 | S2 | E2 | $\overline{SI}$ | EI | ADD | SUB |
| 16 | — | 1111 | PS | — | $(0A - A)$ | 1 | S2 | $\overline{E2}$ | SI | EI | ADD | SUB |
| | | | PS | — | $(0A + \phi A)$ | 1 | S2 | $\overline{E2}$ | | $\overline{EI}$ | ADD | SUB |

FIG. 10 CONTINUED

FLOATING POINT DATA PROCESSING SYSTEM

INTRODUCTION

This invention relates generally to data processing systems, and, more particularly, to those arithmetic operations performed by such systems which utilize floating point techniques.

BACKGROUND OF THE INVENTION

The representation of numbers in data processing systems, particularly non-integer numbers, requires the introduction of a decimal point into the notation. As one option, data processing systems may employ "fixed point notation" wherein the decimal point is placed immediately to the right of the least significant digit or placed immediately to the right of the signed bit before the first information bit.

A further option is called "floating point notation" in which the number is represented by a sign, an exponent, and a mantissa. Such technique is described in many texts, one example being "Computer Architecture", Caxton C. Foster, Van Nostrand Rheinhold Company, New York, N.Y., 1976, pp. 16 et seq.

Floating point processing units tend to become relatively complex when designed for use for large decimal ranges and increased precision capabilities. One technique which provides for a relatively good degree of flexibility and good accuracy, using some simplification of conventionally used floating point architecture, is described in Canadian Pat. No. 1,105,065, issued Aug. 2, 1977, to Richard T. MacAndrew. Such architecture is designed for shifting first and second operands, such operands having first and second mantissa and exponent values, respectively, for performing arithmetic operations. Arithmetic logic means and register means are provided for generating a preselected scale factor, to denote operand shifting requirements. Scaler means therein are connected for selectively loading the registers in serial fashion in a first direction and for scaling an operand input in response to the preselected scale factor. Switch means are utilized for selectively connecting the register to the scaler means for serially writing out of the selected register in the first direction.

While the system shown in the above-referenced Canadian patent has a capability for performing rapid and convenient arithmetic operations on a large range of numbers with a relatively high degree of precision, the speed of the mantissa multiplication operation, which is accomplished on a bit-by-bit basis, is slower than desired and it is helpful to provide for a higher speed multiplication operation, particularly in data processing systems where high speed operations are generally becoming more and more important.

A BRIEF SUMMARY OF THE INVENTION

Improvement in the speed of operation of the mantissa multiplication techniques of floating point decimal systems is provided by performing the operation on four bits of the multiplier mantissa simultaneously, as opposed to using single-bit mantissa multiplication techniques. The 4-bit mantissa multiplication is performed in hexa-decimal notation using appropriately interconnected shifter units, arithmetic logic units and registers.

In accordance therewith, a mantissa register file supplies the mantissa of a number which is to be multiplied (the multiplicand) to a register, the output of which is supplied to two pairs of suitably multiplexed shifter units capable of providing various combinations of multiples of such mantissa. The selection of the multiplier factors is controlled by successive four-bit groups of the mantissa of the second number to be multiplied (the multiplier). The outputs of the multiplexed shifter units supply an arithmetic logic unit for appropriate addition or subtraction thereof and the results stored in a working register. The output of the working register, which effectively represents a partial product for each four-bit multiplying operation, is supplied to a second arithmetic logic unit which continually provides a partial sum of the partial products as they are calculated, which sums are supplied to a final register.

The overall operation is in effect a "pipeline" operation in which the working register always contains the partial product and the final register always contains the partial sum which is fed back into the second arithmetic logic unit to provide a continuous computation thereof.

When all of the four-bit groups of the multiplier have multiplied the mantissa of the multiplicand, the total product at the final register is supplied to the data processing system via an internal mantissa bus to the data bus which provides for data transfer between the processing system and the floating point unit.

The use of multiplexers and arithmetic logic units in such a manner permits high speed multiplication operations to be performed on floating point data, the speed of operation being substantially increased over that provided by the single-bit multiplication techniques of previously utilized floating point systems.

DESCRIPTION OF THE INVENTION

The invention can be described in more detail with the help of the accompanying drawings wherein FIG. 1 depicts a broad block diagram of a data processing system in which the invention can be used;

FIG. 6 depicts a more detailed logic diagram of another portion of the mantissa logic of FIG. 4;

FIGS. 7 and 8 depict a block diagram and a Table No. 1 helpful in explaining a part of the operation of the mantissa logic of FIG. 4;

FIG. 10 depicts a Table No. 2 helpful in understanding the multiplier operation in accordance with the invention.

The floating point processor unit of the invention (hereinafter sometimes referred to as the "FPP") is in itself a distinct processor which performs all the floating point operations for a host central processor unit, although subordinate to the host processor. The host processor unit transfers all data to or from the floating point processor and the FPP performs all the necessary arithmetic operations which are required effectively independently of the host processor operation.

Figure 1:
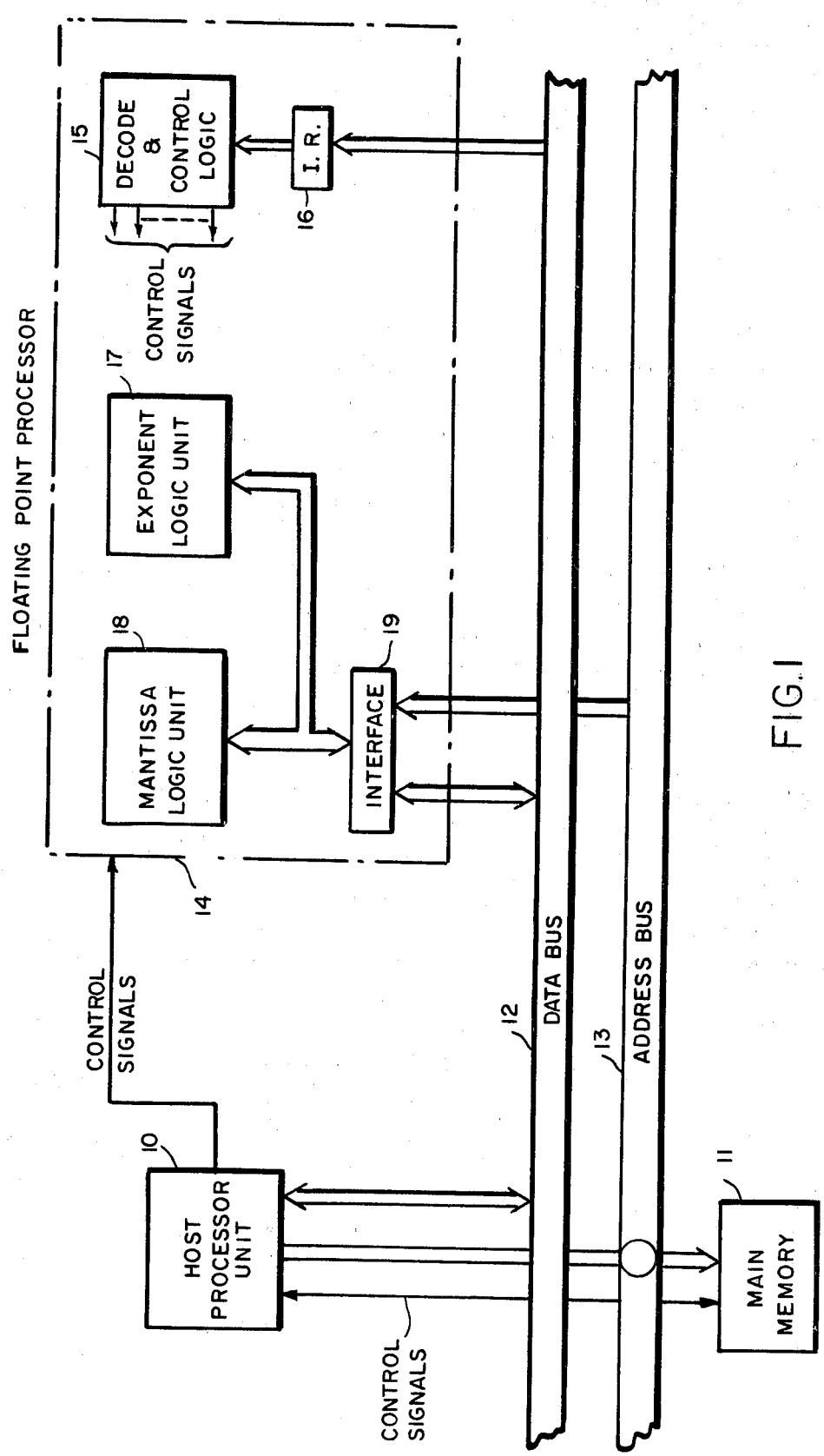

FIG. 1 shows in broad diagram form the floating point processor of the invention and the data, address, and control signal paths to and from such processor in conjunction with the host central processor unit and main memory units of an overall data processing system. As can be seen therein, a host central processor unit 10 communicates with a memory unit 11 via a conventional data bus 12 and an address bus 13. Appropriate control signals for controlling access to and from the memory are also supplied on separate internal paths. The floating point processor (FPP) unit 14 also communicates with the host processor and the memory units via the data and address buses 12 and 13 and has further communication therewith via appropriate control signal lines.

The floating point processor includes an appropriate instruction decoding and control unit 15 which decodes instructions from a floating point instruction register 16 and controls the operation of exponent logic unit 17 and mantissa logic unit 18. The data for the floating point unit is supplied from the data bus through appropriate interfacing logic 19, the results of the mantissa logic and exponent logic operations being combined and supplied to the data bus once the arithmetic operations have been performed.

The FPP contains a copy of the host processor instruction register contents and can buffer one instruction (i.e. store an instruction) while simultaneously executing a previously received instruction. In a preferred embodiment the FPP may be arranged to have a cycle time of 100 nanoseconds, for example, for use with a host processor unit which has, for example, a cycle time of 200 nanoseconds. Thus, the floating processor can provide two micro-instructions for every micro-instruction that the host central processor performs. The FPP remains in an "idle" state until a floating point instruction is read into its instruction register and then it can operate independently from the host processor, except when the central processor is transferring data to or from the floating point unit.

In general, the floating point processor stores every instruction which is fetched from memory by the host instruction register. If the instruction is a floating point instruction, and does not require any data from the memory, the floating point processor, if it is not already busy, can immediately decode the instruction and begin execution of the floating point arithmetic operation. While it is executing the current instruction it can also store in its instruction buffer register the next instruction.

Exponent logic unit 17 includes appropriate registers and computation logic for exponent computations. Such unit also calculates the normalization factors and controls a mantissa shifter to normalize the mantissa results. Logic 17 also calculates the shifts required for add and subtract functions. All such operations can generally be of the type already described in the above-referenced MacAndrew Canadian patent, and need not be described in detail in this application.

The mantissa unit 18 includes appropriate registers and computation logic for mantissa computations (i.e. the mantissa operation desired, whether an add, a subtract, a multiply or a divide). The results are then normalized by the factor calculated by the exponent logic unit and stored in the appropriate floating point accumulator.

Figure 2:
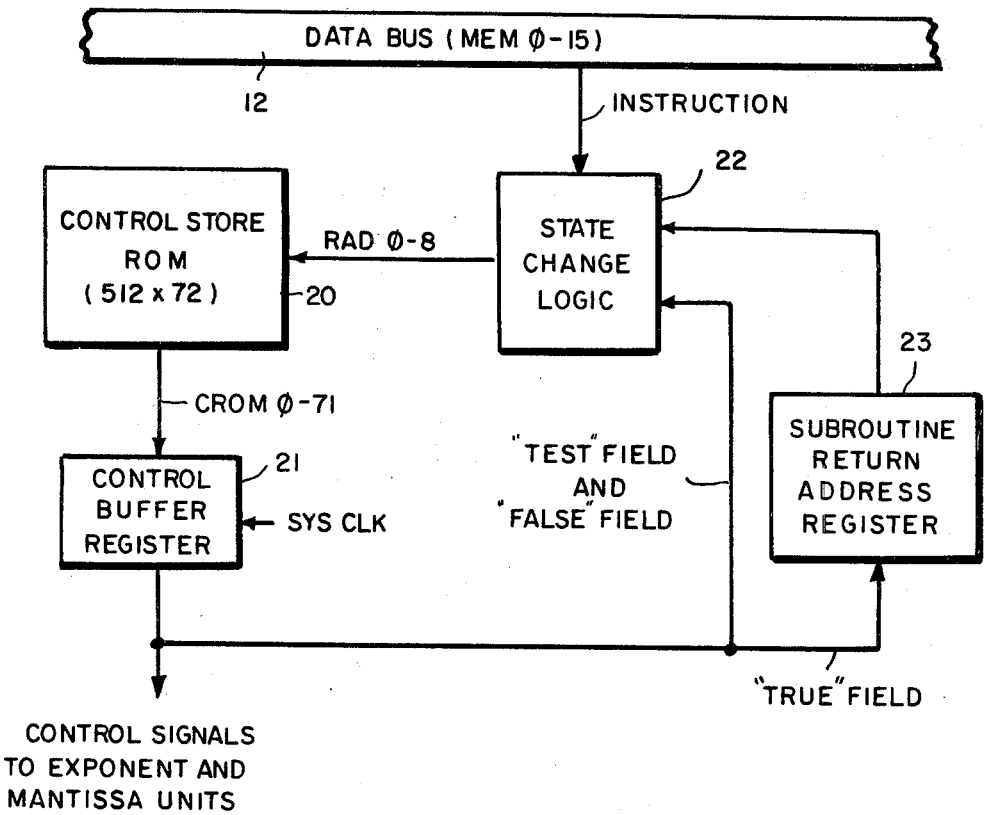
FIG. 2 depicts a block diagram of the control logic of FIG. 1.

The floating point processor control logic 15 communicates with the host central processor unit 10 and controls the execution of the floating point instructions. A block diagram of the control logic is shown in relatively simplified form in FIG. 2. As can be seen therein, such logic contains a control store 20, which store is preferably in the form of a read only memory (ROM) unit storing 512 words of 72-bit lengths and contains the microprograms which perform the desired floating point operations in accordance with the floating point instructions. A control buffer register 21 stores the micro-instruction which is currently being executed. The output of such register controls the functions of the floating point processor via suitable control signals supplied to the exponent and mantissa units. A state change logic unit 22 controls the address of the next floating point processor micro-instruction and includes an appropriate register for copying a part of the instruction register, such register being used by the state change logic unit to control the operations of the floating point processor unit.

The state change logic unit also contains a suitable buffer register for storing the next floating point instruction so that the floating point processor can be executing one instruction while it buffers the next instruction. The state change logic can also use the results from various data tests throughout the floating point processor, the test results being used, for example, to select the next micro-instruction address. Such selected address may be the true or false address fields, the instruction addresses, or an address from the subroutine address register 23. The particular address which is selected by the state change logic 22 is identified as the RAD $\phi$-8 signal which addresses the control store as shown. The instructions from the host central processor unit are supplied to the state change logic unit via the data bus 12.

Figure 3:
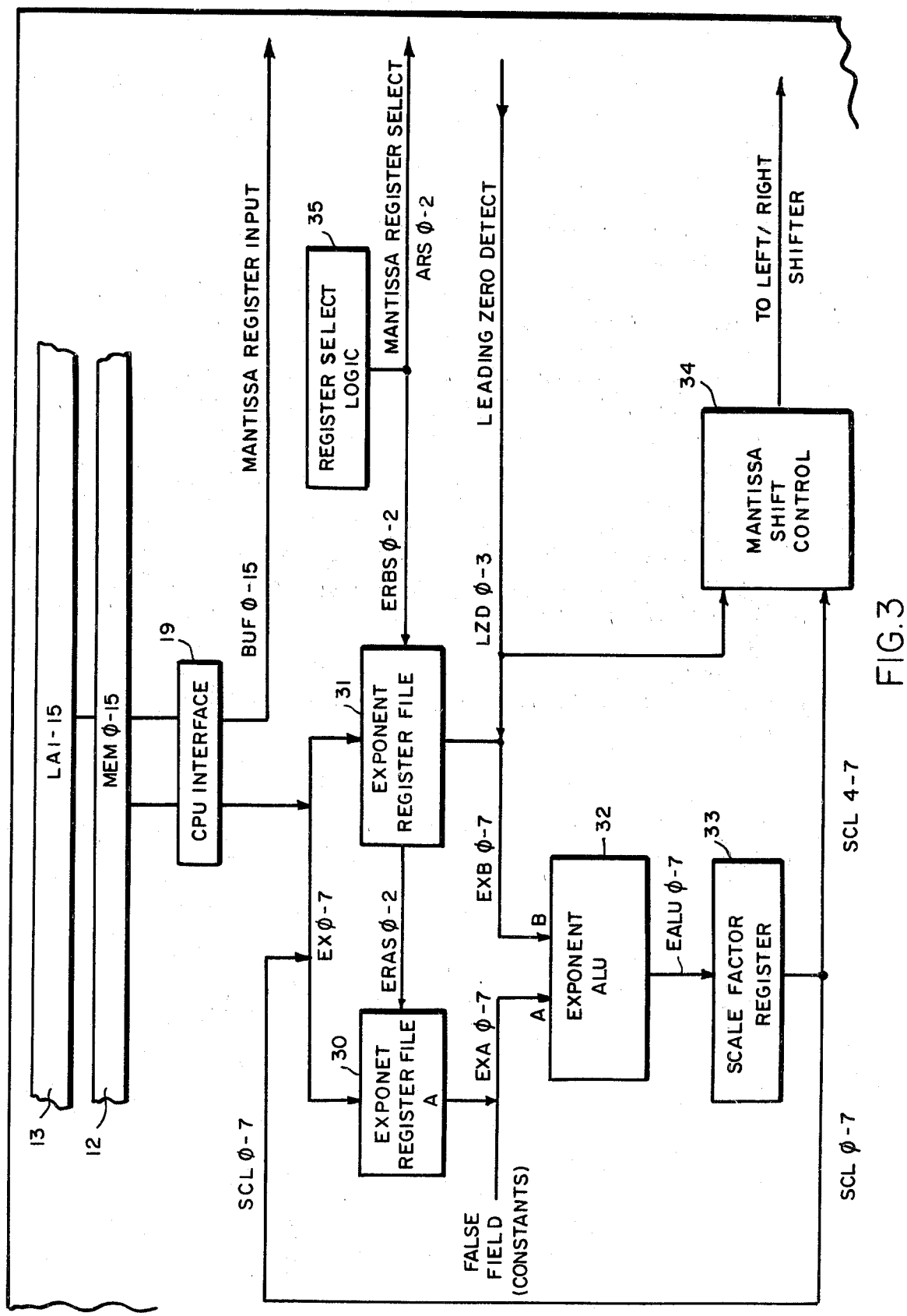
FIG. 3 depicts a block diagram of the exponent logic of FIG. 1.

The floating point processor exponent logic unit 17 is shown in block diagram form in FIG. 3. Such logic unit provides the arithmetic capability for handling exponent calculations for all floating point operations. Such capability includes the "sign" bit of the mantissa and the exponent, which in a preferred embodiment is represented by 7 bits. The exponent register files 30 and 31 contain the exponent and the sign of the mantissa of all floating point numbers which are in the floating point processor. Two register files are used so that two exponents can be addressed together in the same micro-instruction. The two files are addressed by different selector bits, register file 30 being addressed by bits ERAS$\phi$-2 and register file 31 being addressed by bits ERBS$\phi$-2. The exponent arithmetic logic unit 32 can add or subtract two exponents, add a constant to an exponent, add or subtract a normalizing factor, increment or decrement an exponent. The output of the arithmetic logic unit 32 is stored in a scale factor register 33, the output (SCL$\phi$-7) of which can be stored back in the register file or a portion of the output (SCL4-7) of which can be used to effect the mantissa left-right shifter unit via the mantissa shift control unit 34.

Register select logic unit 35 selects one of the eight registers in the two exponent register files and in the mantissa register file (as discussed below).

The mantissa shift control unit 34 uses the "leading zero detect" information (LZD$\phi$-3) or the scale factor register output (SCL4-7) to shift the mantissa to the left or to the right by $\phi$-15 hexadecimal digits. Such shift can be performed in one micro-cycle (i.e., in a preferred embodiment, in the 100 nanosecond micro-cycle of the floating point processor). Shift control unit 34 may also use other information to shift the mantissa as, for example, to shift the mantissa for transfer to memory utilizing two suitably connected loop counters.

A data buffer unit in the CPU interface 19 controls the loading of data into the floating point processor, the data from the data bus 12 being routed to the exponent unit or to the mantissa unit. Another buffer stores the program count whenever a floating point instruction is received in case of an error by the floating point processor unit. Such interface unit also contains the status registers for the floating point processor which store information on the current status of the FPP unit.

Figure 4:
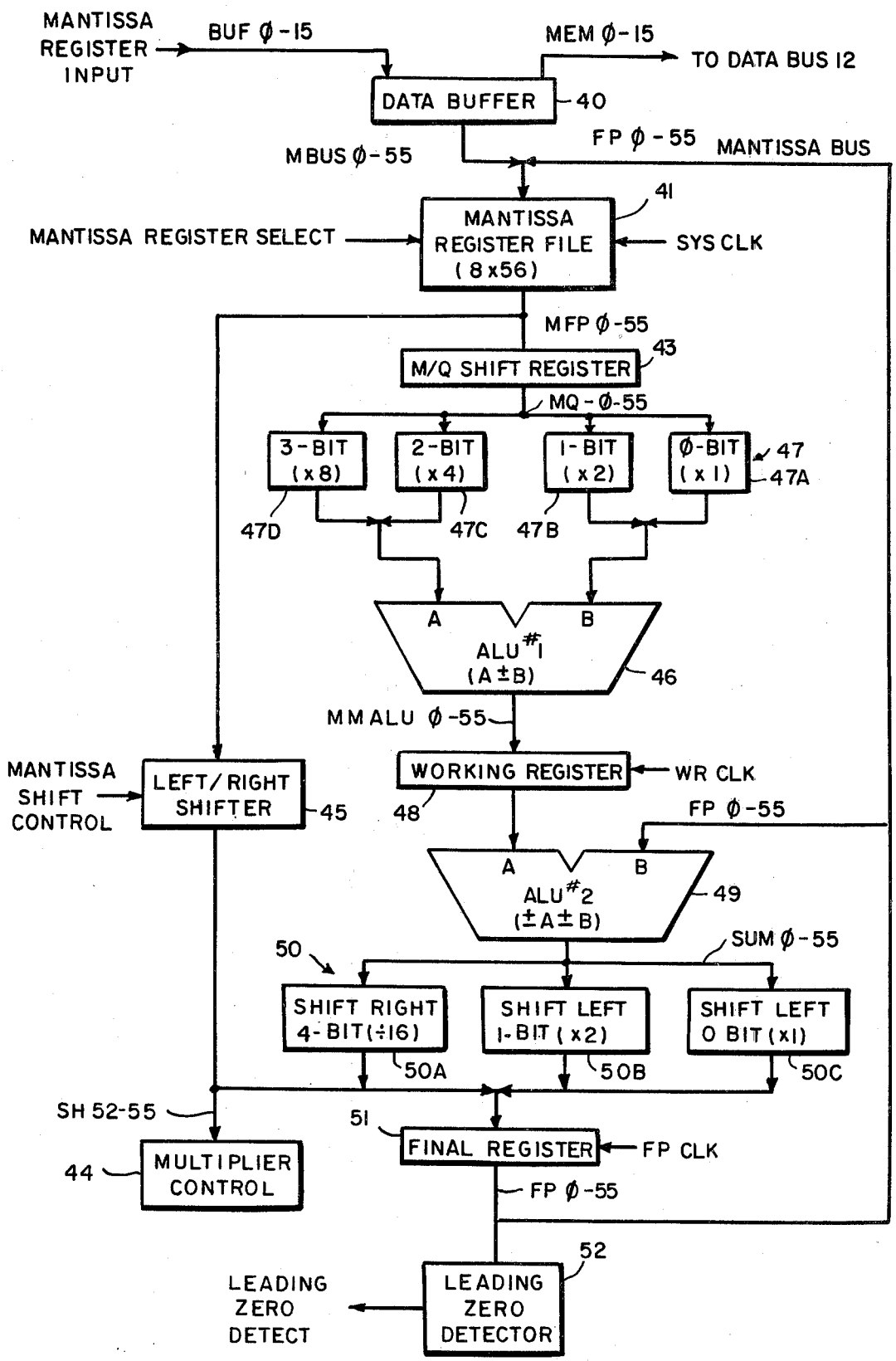
FIG. 4 depicts a block diagram of the mantissa logic of FIG. 1.

The mantissa unit 18 is shown in more detail in the block diagram of FIG. 4 and performs all the mantissa calculations for the floating point processor unit. The mantissa unit also includes the storage in the floating point accumulators of the mantissa register file 41 of the mantissa portions of all of the floating point numbers in the floating point processor unit. The mantissa unit is controlled by the micro-program and the control section of the floating point processors discussed in connection with FIG. 2.

The mantissa data buffer register 40 controls the destination of the data (BOF $\phi$-15) from the data buffer at the interface unit of FIG. 3. Such data is placed on the proper section of the internal mantissa bus (the data being there identified as MBUS$\phi$-55) and stored in the proper floating point accumulator of the mantissa register file 41 (eight 56-bit registers). Data buffer 40 can also operate in the reverse direction by placing the required 16-bit data portion (MEM $\phi$15) from the mantissa bus onto the data bus 12.

The mantissa register file 41 includes, in a preferred embodiment, eight data words of 56 bits per word and is addressed by the register select logic 35 of the exponent logic unit (see FIG. 3). The output of the register file 41 is utilized as the input to a register 43, identified as the M/Q (multiplicand/quotient) register, and to a mantissa left-right shifter unit 45.

M/Q register 43 is used to store one of the operands (multiplicands) during a multiply operation or to receive the result (quotient) of a divide operation. In the latter case the divide result is shifted into the M/Q register one bit at a time, such bit being the carry out from a second arithmetic logic unit and a final register described below.

A first arithmetic logic unit 46 and a multiplexed shift network 47 utilize the output of the M/Q register the shift network being controlled by the four least significant digits of the mantissa shifter unit 45 (SH52-55) via multiplier control unit 44 to perform a hexadecimal 4-digit miltiply operation, as discussed more fully below. The output of the M/Q register 43 is shifted by 0 to 3 bits (thereby effectively multiplying the multiplicand by 0,1,2, 4 or 8, or combinations thereof) by the shifter network units 47A, 47B, 47C and 47D respectively. The arithmetic logic unit 46 adds these shifted values in a manner such that the output of arithmetic logic unit is the output of the M/Q register multiplied by 0 to 15 in accordance with hexadecimal notation. Such a partial product is stored in a working register 48 and is added to any previously calculated partial products during the next micro-cycle.

A working register 48 holds the current calculated partial product from the first arithmetic logic unit 46 during a multiply operation. During a divide operation the working register holds the denominator. During an addition or a subtraction process such register holds the source.

A second arithmetic logic unit 49 and its shift network 50 utilize the output of the working register 48 and the output of a final register 51. The output of arithmetic logic unit 49 is an input to the final register via the shift network. Arithmetic logic unit 49 adds any previously summed partial products (stored in the final register) to the current partial product result from the first arithmetic logic unit 46 and shifts the new partial product 4 bits to the right in order to maintain normalization.

Mantissa left/right shifter unit 45 is controlled by the shift control unit 34 of the exponent logic (see FIG. 3). Such shifter can shift a 56-bit mantissa to the left or to the right 0 to 15 hexadecimal digits within one microcycle. The shifter is used to pre-align the mantissa's preceding addition or subtraction operation and is also used for post normalization following a multiply or a divide operation. It is also used in the multiply operation to shift the proper hexadecimal digit into the multiply control unit 44 to control the shift network 47.

The final register 51 holds the results after any operation, the input to the final register being the output of the second arithmetic logic unit 49 and its shift network 50 or the output of the mantissa left/right shifter unit 45. The output of the final register is also supplied to the input to a leading zero detector unit 52 for supply to the exponent logic unit (FIG. 3). Such output also can be placed on the internal mantissa bus for transfer to memory via data buffer 40 and data bus 12 or to the floating point accumulators of the mantissa register file 41.

The leading zero detector 52 detects any hexadecimal digits in the final register which are equal to zero. This is the normalization factor used by the exponent section to adjust the exponent of the result and to control the mantissa shifter.

Since the exponent logic (FIG. 3) and the general micro-program control therefor is of the type already described in the MacAndrew Canadian patent mentioned above, the details of such operation, particularly with respect to addition, subtraction, and divide operations for the FPP, need not be described in further detail here. A unique feature of the floating processing unit however, lies in the mantissa logic unit 18 when such unit is performing a multiply floating point operation. Such operation is described in more detail below in connection with FIG. 4, a more detailed structure and discussion thereof being shown with respect to FIGS. 5–10 which include Tables Nos. 1 and 2 of the drawings.

Figure 5:
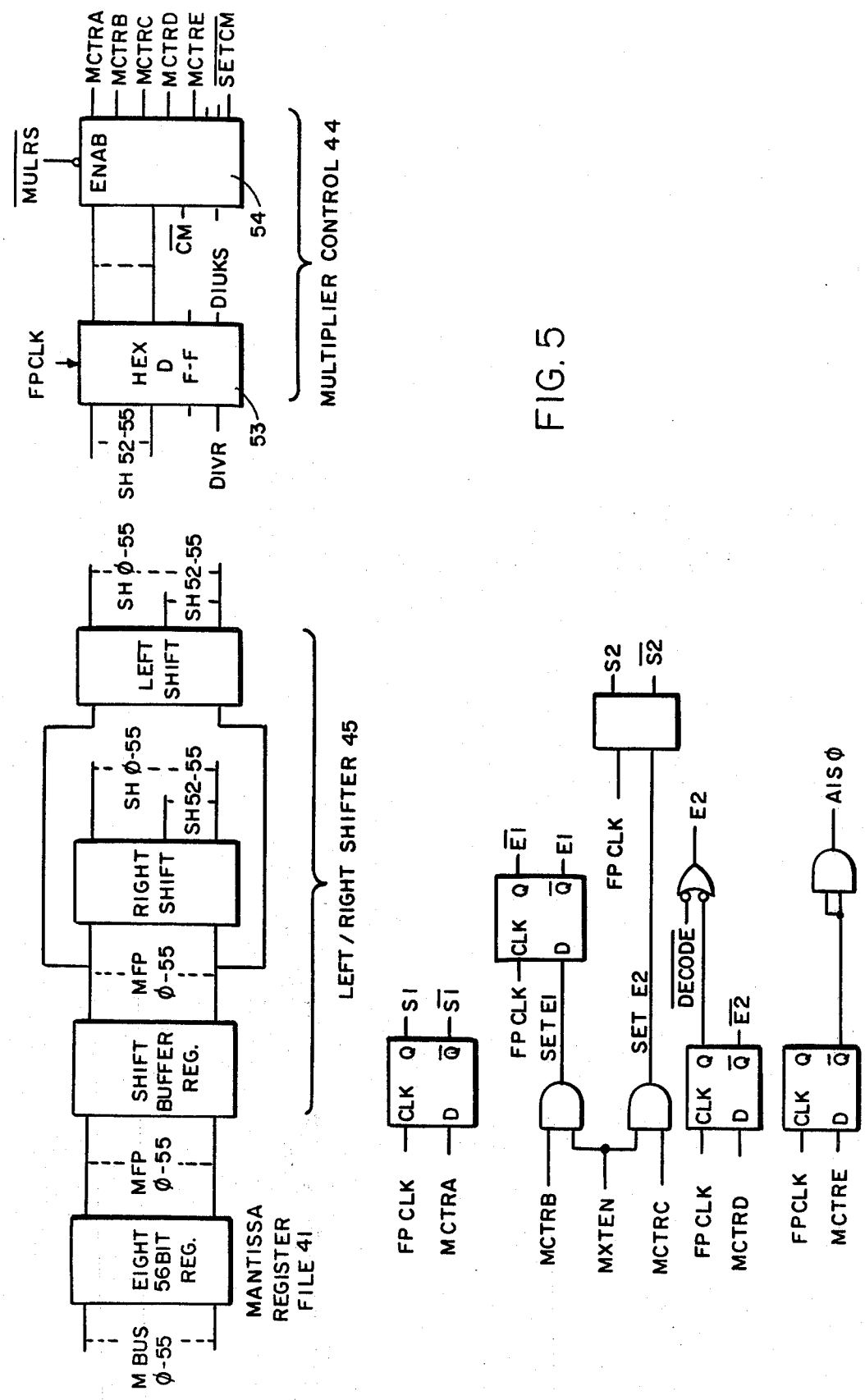
FIG. 5 depicts a more detailed logic diagram of a portion of the mantissa logic of FIG. 4.

FIGS. 5–7 show in more detailed form the components of the mantissa unit of FIG. 4. The mantissa register file 41 is a plurality of eight 56-bit registers which provide a 56-bit multiplier word MFP $\phi$-55 from the data input word MBUS$\phi$-55 received from data buffer 40. The output of the mantissa register file 41 is supplied to a shift buffer register 50 which supplies the word (MPR$\phi$-55) to be shifted to the right or to the left by right shifter 51 or by left shifter 52 as determined by the mantissa shift control signal.

In order to perform a multiply operation in accordance with the invention, the multiplicand is multiplied sequentially by four bits at a time of the multiplier, the multiplicand being supplied by the M/Q register 43. The multiplication thereof by the current four bits of the multiplier is performed by shifter networks 47 the operations of which are controlled by the multiplier control unit 44, as explained below. Thus, each successive four bit portion of the multiplier, beginning with the least significant bits thereof, at the output of the left/right shifter 45 is supplied to multiplier control unit 44 which in turn controls the multiplication operation for each partial product that is so obtained by operation of shift network 47 and ALU 46.

Each partial product is supplied to working register 48 and thereupon added to the previously calculated partial product at ALU 49, the continuously summed partial products thereby being supplied to final register 51. As can be seen in FIG. 4, after each the output of ALU 49 is divided by 16 (i.e. a four-bit shift to the right) in shifter unit 50A until each 4-bit group has performed its multiplication operation. The final register contents are fed back to ALU 49 so that the latter unit can continuously produce the partial product sum as desired. Shifter units 50B and 50C are used when performing division.

The four-bit partial product obtained by the operation of shift network 47 and ALU 46 can be controlled to produce the partial product of any of 16 hexadecimal values for each four-bit portion of the multiplier by suitably controlling the combinations of shift network outputs supplied to the A and B inputs of ALU 46. For example, multiplication by ($\times 3$) can be accomplished by multiplying by ($\times 4$) at shift network 47D and subtracting therefrom a multiplication by ($\times 1$) at shift network 47A.

The multiplier control unit 44 is shown in more detail in FIG. 5 as comprising hex D flip-flop unit 53 which is responsive to the four least significant bits (SH 52-55) of the multiplier, as obtained at the output of right shifter 51 (the multiplier bits MPR $\phi$-55 are successively shifted four bits to the right for each successive 4-bits multiply operation). Multiplier control unit 44 thereby provides input control signals to register 54 which provides the multiplier control signals MCTRA through MCTRE. The latter signals provide for the enabling or disabling of shift networks 47A-47D (by the E1 and E2 signals) and for the selection of the appropriate multiplication factor ($\times 1$, $\times 2$, $\times 4$, $\times 8$ by the S1, $\overline{S1}$, S2, $\overline{S2}$ signals), as shown in FIGS. 5 and 6.

The operation of the shift networks 47A-47D and ALU 46 can be explained with the help of FIG. 7 and Table No. 1. The shift networks are, in effect, two multiplexed multipliers, one for providing multiplication by either ($\times 1$) or by ($\times 2$) and the other for providing multiplication by either ($\times 4$) or ($\times 8$). The multiplexed multipliers are enabled or disabled as shown in Table 1 and the selection of the multiplication factor is determined by the select signals S1, $\overline{S1}$, S2, $\overline{S2}$, the outputs of the multiplexed multipliers being added or subtracted, as required, by ALU 46. Thus, if multiplication by ($\times 3$) is desired, the multiplexed multipliers can be controlled such that both are enabled (E1 and E2 are asserted) and such that S1 and S2 are asserted to provide multiplication by ($\times 1$) and ($\times 4$), respectively. The products are then subtracted (i.e. $-A+B$) so that the overall partial product is ($\times 4$)$-$($\times 1$) resulting in a multiplication by ($\times 3$).

Table No. 2, together with FIG. 7 and Table No. 1, illustrate how a hexadecimal partial product operation can be performed for a four-bit multiplication using the shift networks 47A-47D, the ALU 46, and the ALU 49. Thus, if the multiplicand is indicated as "A", the partial sum of the partial products as "PS", and the carry-bit as "CN", the chart of Table No. 2 depicts the "select" (SEL) and "enable" (EN) operations at the shift networks and the addition (Add) or subtraction (Sub) operations required by the ALU's in order to provide the correct multiplication for a four-bit multiplier value in hexadecimal notation. The table depicts the operation required for multiplication by any of the 16 values represented by the first four least significant bits of the multiplier. The multiplier is then shifted four bit positions to the right in the left/right shifter 45 so that the next four bits are now in the least significant bit positions and the 4-bit multiplication operation proceeds for the next hexadecimal value represented by such successive four bits, and so on, until multiplication has been completed for all the 4-bit groups of the 56-bit multiplier word.

In the overall multiplication operation the ALU 46 produces the partial products and the ALU 49 produces the partial sums of the partial products until the sum of all partial products is obtained (multiplication by the last 4-bit group of the multiplier has occurred), whereupon the final register 51 provides the completed product of the multiplicand provided by the M/Q register 43 and the multiplier provided from the mantissa register file via left right shifter 45.

The addition, subtraction, and division operations can be essentially performed in the same manner as discussed in the aforementioned Canadian patent of MacAndrew and are not explained in further detail here.

Figure 9:
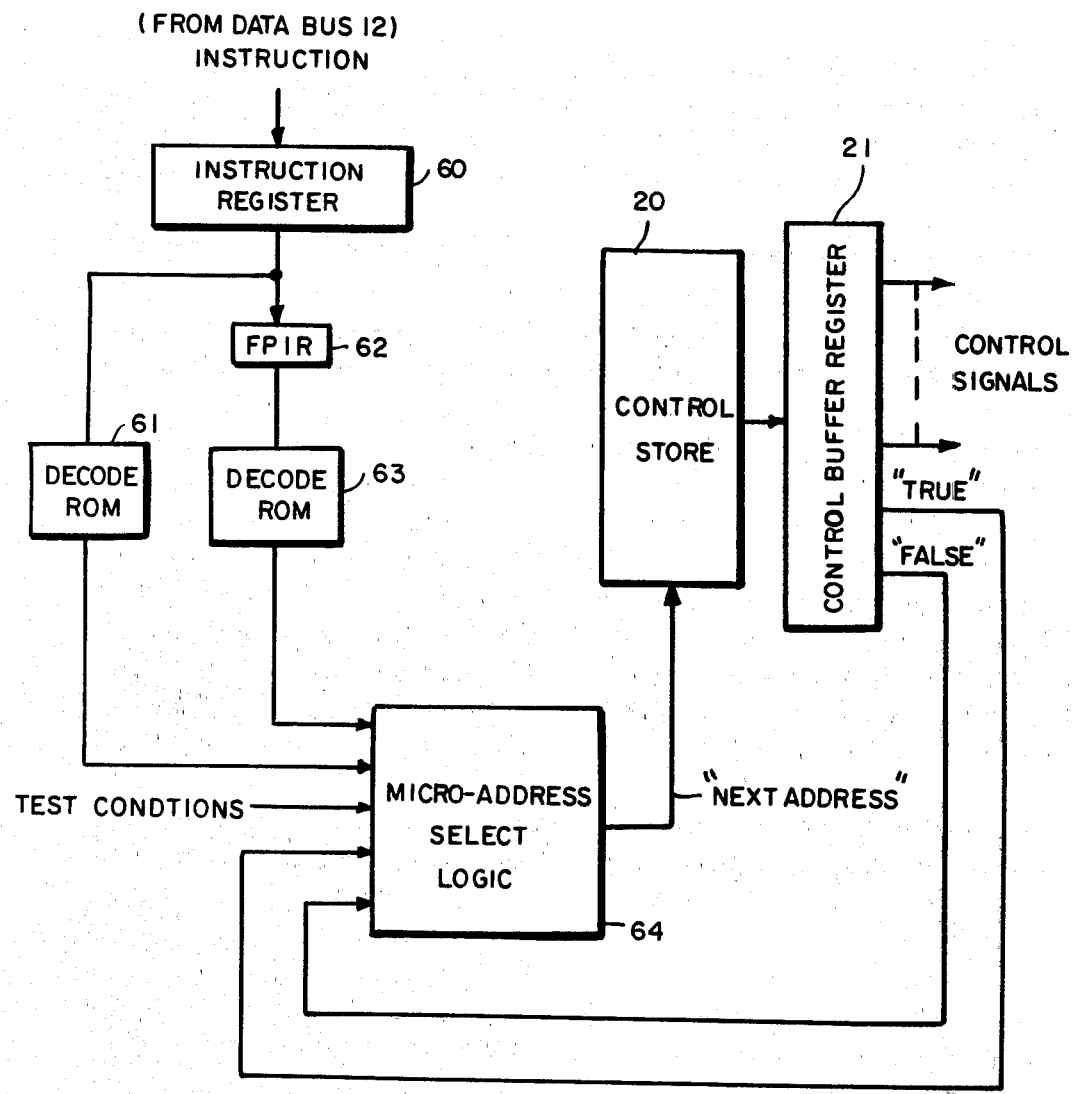
FIG. 9 depicts a block diagram of the decode and control logic of FIG. 1.

FIG. 9 shows a more detailed block diagram of the instruction and decode portion of the floating point unit. As also discussed with reference to FIG. 2, each instruction supplied to the host processor unit is also simultaneously supplied to the floating point processor via the state change logic 22 which includes an instruction buffer register 60 for such purpose. Floating point instruction register (FPIR) 62 receives the instruction from buffer register 60 and, if the instruction is a floating point instruction, the instruction is decoded by means of decode ROM 63 to produce the next microprogram address for control store 20. If the instruction is not a floating point instruction, the instruction will not produce a micro-program address at ROM 63. The address is appropriately supplied to control store 20 via suitable micro-address selection logic 64. Control store 20 thereupon supplies the micro-instruction control signals required to execute the selected floating point instruction micro-program via control buffer register 21. ROM 61 also performs the same decoding of the instruction from instruction buffer 60 as does ROM 63. The decoded address from ROM 61 can be selected when a floating point instruction has been received before the execution of a previous floating point instruction has been completed. In order to obtain the next decoded address and begin the next instruction microprogram more quickly than would be the case if the instruction were transferred to FPIR 62 and thence to decode ROM 63, the instruction can be clocked into and out of decode ROM 61, thereby providing a time saving of one micro-cycle.

Mirco-address select logic 64 is used to select the "next address" from decode ROM 63 or decode ROM 61, and can also be used to select the "true" address field, the "false" address field or appropriate test conditions, as shown.

In summary, the instruction and decode logic provides the required control signals for achieving the execution of a floating point operation by means of suitable software stored in control store 20. The operations can then be performed by the exponent and mantissa units as described above, the particular advantage of the mantissa configuration being that multiplication can be achieved by four-bit multiplier techniques as opposed to the single bit multiplication use in the MacAndrew system, for example.

We claim:

1. A digital data multiplier for providing the product of two values expressed in digital form comprising
   means for providing a first digital data word representing a first of said two values;
   means for providing a second digital data word representing a second of said two values;
   means for providing successive groups of data bits of said second data word;
   control logic means responsive to said successive groups of data bits for providing successive multiplier control signals;
   shifter means for successively shifting the data bits of said first data word by a first selected number of positions to produce a first shifted data word and by a second selected number of positions to produce a second shifted data word, the selection of said first and second selected number of positions being successively controlled by said successive multiplier control signals;
   first combining means responsive to said first and second shifted words for producing a single word which represents successive partial products of said first data word and said successive groups of bits of said second data word;
   second combining means responsive to said successive partial products for producing an intermediate product word which represents the sum of the successive partial products produced by said first combining means, said second combining means providing a final intermediate product word which directly represents the final product of said two values.

2. A digital data multiplier in accordance with claim 1 wherein said successive groups of data bits of said second data word comprise groups of four data bits each.

3. A digital data multiplier in accordance with claim 2 wherein said shifter means comprising a
   first multiplexed shifter having first and second shifter units for providing, when enabled, a shift of said first data word by a first or second selected number of positions, respectively; and
   a second multiplexed shifter having third and fourth shifter units for providing, when enabled, a shift of said first data word by a third or fourth selected number of positions, respectively.

4. A digital data multiplier in accordance with claim 3 wherein said control logic means provides control signals for selectively enabling said first and second multiplexed shifters and, when enabled, for selectively shifting said first data word by the said first or said second number of bit positions in said first multiplexed shifter and by the third or said fourth number of bit positions in said second multiplexed shifter.

5. A digital data multiplier in accordance with claim 4 wherein said first and second data words are expressed in hexadecimal notation and said first, second, third and fourth number of bit positions are $\phi$, 1, 2, and 3, representing multiplication of said data word by 1, 2, 4, and 8, respectively.

6. A digital data multiplier in accordance with claim 1 and further including working register means responsive to the output of said first combining means for retaining said successive partial products and supplying said successive partial products to said second combining means.

7. A digital data multiplier in accordance with claim 6 and further including final register means responsive to the output of said second combining means for retaining said intermediate product word and supplying said intermediate product word to the input of said second combining means, said final register means also retaining said final intermediate product word.

8. A digital data multiplier in accordance with claim 7 and further including means for shifting the output of said second combining means as each successive intermediate product word is produced, the shifted output being supplied to said final register means.

9. A digital data multiplier in accordance with claim 1 for use in a floating point computation section of a data processing system, said floating point computation section including an exponent computation unit and a mantissa computation unit wherein said multiplier is responsive to two mantissa values for providing the product thereof.

* * * * *